July 16, 1968
H. H. PICK ET AL
3,392,582
HAND-HELD PORTABLE DEVICE FOR MEASURING FROTH
DEPTHS IN FLOTATION MACHINES
Filed Oct. 22, 1965
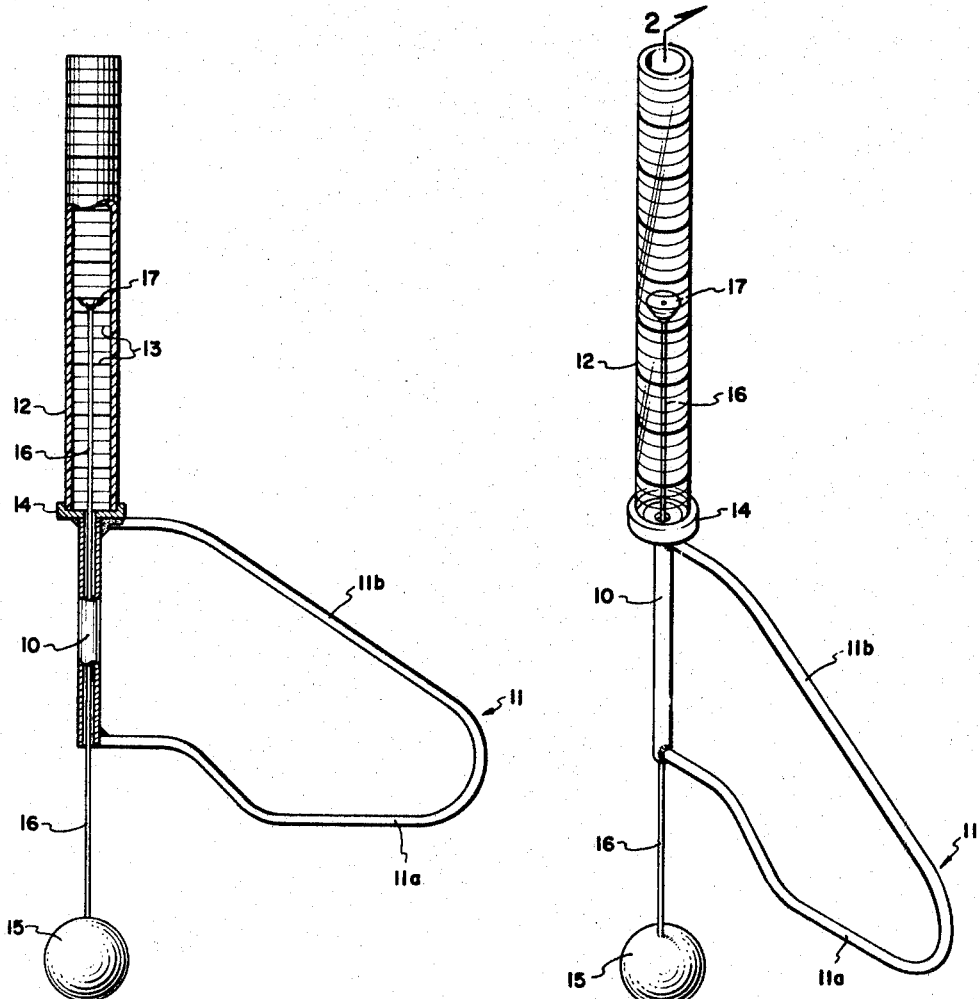
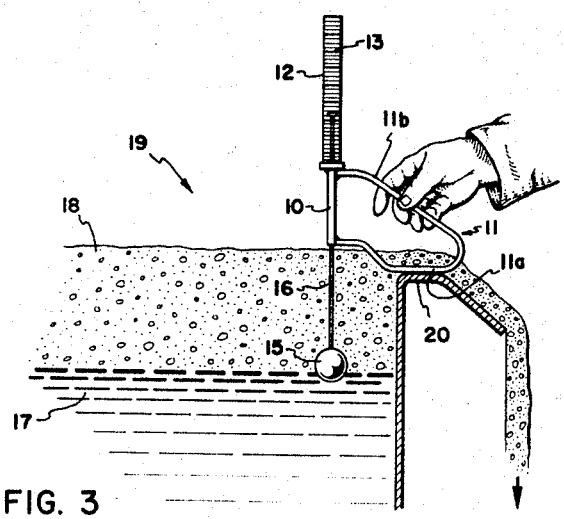
INVENTORS
HANS H. PICK
RALPH W. CROSSER, JR.
JOSEPH W. RIBOTTO
BY
ATTORNEYS ": 3,392,582
Patented July 16, 1968

3,392,582
HAND-HELD PORTABLE DEVICE FOR MEASURING FROTH DEPTHS IN FLOTATION MACHINES
Hans H. Pick, Ralph W. Crosser, Jr., and Joseph W. Ribotto, Salt Lake City, Utah, assignors to Kennecott Copper Corporation, New York, N.Y., a corporation of New York
Filed Oct. 22, 1965, Ser. No. 502,651
6 Claims. (Cl. 73—322)

ABSTRACT OF THE DISCLOSURE

A hand-held, portable, measuring device for directly reading the depth of froth in a flotation machine. A tube is provided with a specially shaped, laterally extending loop adapted to serve both as a handle and a positioning means for locating the device in a desired measuring position with respect to a froth overflow lip of a flotation machine, and a float which has its stem extending upwardly through the tube into indicating association with a scaled measurement element.

---

This invention relates to the useful art of hand-held, portable, measuring devices.

The problem of concern in the making of the invention was the obtaining, quickly, easily, and economically, of measurements of the depth of froth from time to time in froth flotation machines, wherein a liquid pulp of the materials to be separated, usually minerals, is aerated along with one or more chemical reagents to produce bubbles that rise through the pulp, pick up certain of the materials, and form a froth on the surface of the body of pulp in the machine.

In order to determine proper flow adjustments for such flotation machines, the amount of frother reagent additions, and overall machine performance, it is important to know the depth of the material-carrying froth and to keep abreast of changes in forth depth during the course of machine operation. Froth depth measurements have been made on a haphazard basis heretofore by a variety of procedures, including installation in the flotation machine, as a peramnent part thereof, of float-operated measurement devices. Such installations have not proven satisfactory as a general proposition, however, because of the tendency for many types of flotation pulps to build up accretions of solids on structural surface which they contact. Such accretions seriously affect the accuracy of measurement devices.

The inventive concepts here involved include the realization that a hand-held float gauge that can be introduced momentarily into a flotation machine for the taking of measurements, that can be carried from flotation cell to flotation cell in a bank of machines, and that can be easily washed free of adherent matter between instances of use, is required for the purpose, and include, further, the structural and functional features of such a gauge.

In accordance with the invention, a hand-held, portable, float gauge that has proven highly successful for the intended purpose comprises a rectilinear, scaled, measurement element extending rectilinearly from an end of an elongate, rectilinear, guide tube for the elongate, rectilinear stem of a float adapted to seek and ride on the interface between liquid pulp and overlying froth. Attached to the guide tube and offset laterally therefrom is a combination handle and positioning food adapted to be held by the user and, at the same time, set firmly against the froth-overflow lip of the flotation machine concerned for any particular measurement. The float and the lower portion of its stem extend below the positioning foot and are free to seek the interface. The upper portion of the float stem carries a pointer or other indicator that travels up and down the scale of the measurement element, which is arranged to give a direct reading of froth depth.

There is shown in the accompanying drawing an embodiment of the invention representative of what is presently regarded as the best mode of carrying out such invention in actual practice. Further objects and features will become apparent from the following detailed description.

In the drawing:
FIG. 1 is a perspective view of the device;
FIG. 2, a fragmentary vertical section taken on the line 2—2 of FIG. 1; and
FIG. 3, a fragmentary vertical section taken transversely through the froth overflow lip of a typical flotation machine and showing the device in use.

Referring to the drawing:
In the form illustrated, the device of the invention comprises an elongate, rectilinear, guide tube 10, which is advantageously of metal, and a combination handle and positioning foot 11, which is advantageously a heavy metal wire or a light metal rod bent to loop formation and connected at its ends to the ends of guide tube 10, as by welding. As so arranged, the combination handle and positioning foot 11 is offset laterally from the guide tube 10 and its associated operating elements to be described.

Secured to the upper end of guide tube 10 and extending rectilinearly upwardly therefrom concentrically therewith as a scaled measurement element is a larger diameter tube 12 of some transparent material, preferably a plastic, that is marked along its length with preferably circumferential depth measurement graduations providing a depth scale 13. As shown, tube 12 is secured to tube 10 by means of a collar 14 that closes the lower end of tube 12 outwardly from its communication with the bore of guide tube 10, and has an open top for cleaning purposes.

A float 15, which may be of any suitable type, for example, a hollow plastic ball, as shown, is fastened to the lower end of an elongate rectilinear rod 16, which rises as an inverted stem for such float, passing through guide tube 10 and into scaled measurement tube 12. Fastened to the upper end of such stem 16 is a pointer 17, which not only serves as a measurement indication on scale 13, but prevents stem 16 from dropping out of its guide tube 10. The float is external to the guide tube 10.

The length of stem 16 will depend somewhat upon conditions in the flotation mill where the device is to be used, but will be such as will enable float 15 to seek the interface level between the pulp 17, FIG. 3, and the froth 18 in a flotation machine 19 when the positioning foot 11a of the device is rested squarely and firmly against the overflow lip 20 of such machine, as shown.

To enable the positioning foot 11a of the device to be quickly seated squarely and firmly on the froth overflow lip of a flotation machine by a user holding the handle portion 11b in one hand, as indicated, such foot is provided as an elongate and rectilinear portion of the offset combiation handle and foot at the bottom thereof and remote from its connection with the guide tube, as shown. As illustrated by FIGURE 3, the foot 11a of the combination 11 is contoured to seat on the upper surface of the froth-overflow lip 20 such that when the device is positioned to take a measurement, the guide tube 10 is oriented in an essentially vertical position, spaced from the wall of the machine that supports the froth overflow lip. The guide tube 10 is held suspended out over the body of pulp 17 and froth 18.

It will be realized, of course, that stem 16 must slide freely within guide tube 10, but that there must not be excessive play. A ⅛ inch diameter rod for stem 16 and 3/16 inch inside diameter tubing for tube 10 has been found very satisfactory for most instances of use.

Whereas there is here illustrated and specifically described a certain preferred construction which is presently regarded as the best mode of carrying out the invention, it should be understood that various changes may be made and other constructions adopted without departing from the inventive subject matter particularly pointed out and claimed herebelow.

We claim:

1. A hand-held, portable, measuring device having particular utility for measuring froth depths in flotation machaines, comprising an elongate, rectilinear, guide tube; a combiation handle and positioning foot secured to and extending laterally from the tube in offset relationship therewith, the lower surface adjacent the outer end of said combination being contoured to seat on the upper surface of the froth-overflow lip of a flotation machine for maintaining the device level with the guide tube suspended in substantially vertical position out over the body of froth and pulp, and the upper portion of said combination being formed as a handle; an elongate, rectilinear, scaled measurement element, extending rectilinearly upwardly from the tube and calibrated to indicate froth depth; and a float having an elongate, rectilinear stem, extending upwardly therefrom and through the tube into measurement-indicating association with the scale of the measurement element, said stem having sufficient length to enable the float to seek the interface level between pulp and froth in said flotation machine.

2. The device of claim 1, wherein the positioning foot portion of the combination handle and foot is an elongate rectilinear portion of the bottom of said combination remote from the connection of said cmbination with the guide tubes.

3. The device of claim 1, wherein the combination handle and positioning foot is formed by a loop of rigid material.

4. The device of claim 3, wherein the guide tube is of metal, the loop is of metal, and the ends of the loops are welded to the tube at opposite ends thereof.

5. The device of claim 1, wherein the scaled measurement element is a tube of transparent material that is larger in diameter than the guide tube and that is concentric with the guide tube.

6. The device of claim 5, wherein a measurement indicator is secured to the upper end of the stem of the float.

References Cited
UNITED STATES PATENTS

| | | | |
|---|---|---|---|
| 598,985 | 2/1898 | Fleming | 73—307 X |
| 1,173,117 | 2/1916 | Obermann | 73—322 |
| 1,263,451 | 3/1918 | Martin | 73—315 |
| 1,747,022 | 2/1930 | Zur Nieder | 73—306 X |
| 1,893,198 | 1/1933 | Corson | 116—118 X |
| 2,457,905 | 1/1949 | Korody. | |
| 2,732,820 | 1/1956 | Hoyt | 116—118 |
| 2,840,034 | 6/1958 | Danias | 73—307 X |
| 3,218,858 | 11/1965 | Van Woert | 73—306 |
| 3,274,692 | 9/1966 | Morrison | 33—169 |

WILLIAM D. MARTIN, JR., *Primary Examiner.*